June 26, 1923. 1,460,200
J. W. LAVERENCE
AUTOMOBILE GATE
Filed July 2, 1920
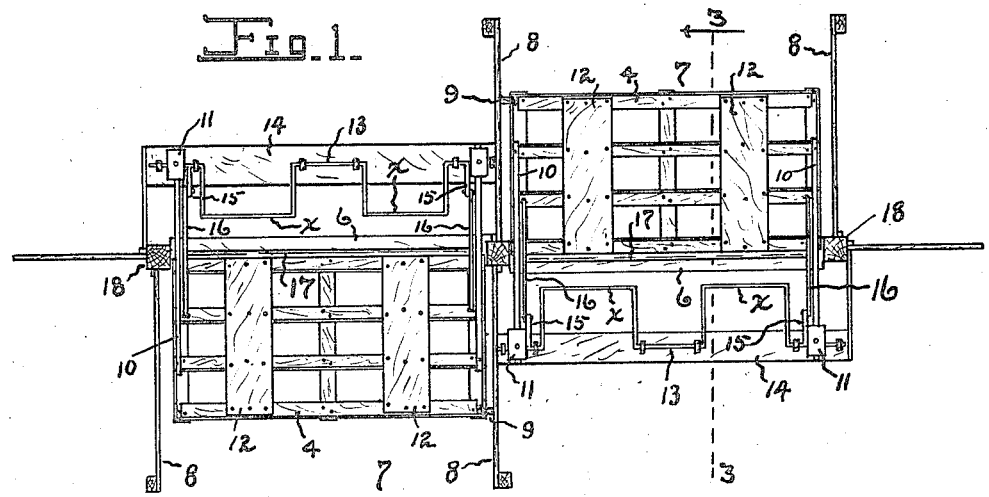
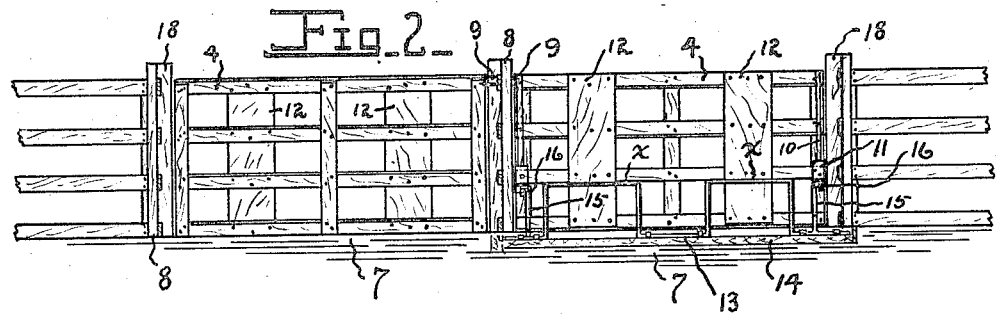
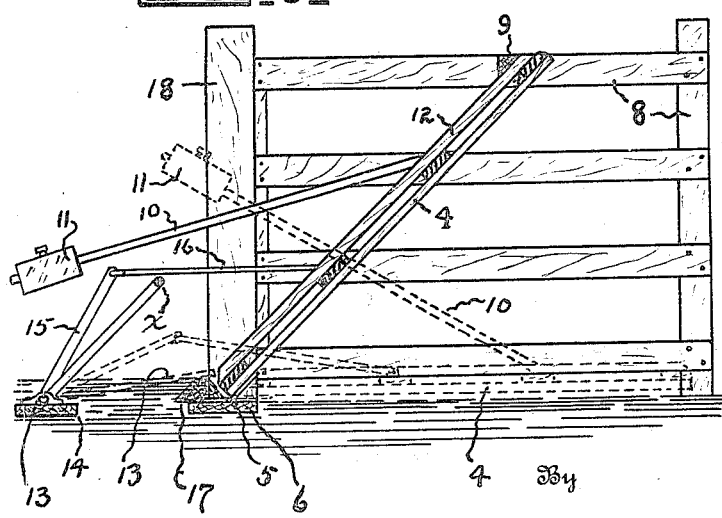
Inventor
John W. Laverence,
By Hiram A. Sturges
Attorney Patented June 26, 1923.

1,460,200

UNITED STATES PATENT OFFICE.

JOHN W. LAVERENCE, OF FREMONT, NEBRASKA.

AUTOMOBILE GATE.

Application filed July 2, 1920. Serial No. 393,703.

*To all whom it may concern:*

Be it known that I, JOHN W. LAVERENCE, a citizen of the United States, residing at Fremont, in the county of Dodge and State of Nebraska, have invented certain new and useful Improvements in an Automobile Gate, of which the following is a specification.

This invention relates to a gate adapted to be opened by the weight of a vehicle when driven forwardly, and particularly for use in connection with automobiles.

One of the objects of the invention is to provide such a construction that, without any injury to the gate, it will open automatically by action of the wheels of an automobile or other motor vehicle while driving at ordinary speed.

The invention includes a gate having a pivotal mounting for its bottom or base at or near the ground, and adapted to swing in any desired arc not exceeding 90 degrees for moving to a horizontal or "open" position in a passageway, means being provided for moving the gate automatically to an upright or "closed" position after the vehicle has passed over it.

With the foregoing objects in view the invention presents a novel and useful construction, combination and arrangement of parts as described herein and claimed, and as illustrated in the accompanying drawing, wherein,—

Fig. 1 is a plan view of a pair of gates embodying my invention. Fig. 2 is a view of the same in side elevation. Fig. 3 is an enlarged detail, being a section transversely through one of the gates on line 3—3 of Fig. 2, the broken lines showing the relative position of parts when the gate is in its horizontal or open position.

Referring now to the drawing for a more particular description, it should be stated that the gate is generally used in pairs to accommodate travel in opposed directions, but may be used as a single gate.

Each gate 4, preferably, is rectangular in plan and has a pivotal mounting 5 (Fig. 3.) at its base or bottom upon a horizontal base-plate 6 which is disposed across a passageway 7 formed between a pair of parallel, upright sections or partitions 8, one of which is provided with a stop-lug 9; and any suitable means may be provided for normally maintaining the gate in an inclined position in engagement with the stop-lug, the means herein shown being a pair of arms 10 provided with weights 11, the proportion of parts being such that the gate, on account of the weights 11, will normally remain in an inclined position in engagement with the lug 9, as shown in solid lines in Fig. 3, but may be swung in a circle's arc to a horizontal position, as indicated by broken lines in said Fig. 3.

Each gate is provided with a pair of parallel track-plates 12 extending from its top to its bottom, and it will be understood that the wheels of an automobile may engage the plates 12 when driven across the gate, the latter being swung downwardly to the ground to approximately a horizontal position, and after the automobile has crossed or passed over the gate, the latter will swing upwardly until it engages the lug 9.

In order that the gate will swing downwardly before the wheels of the vehicle engage the plates 12 I provide a crank-shaft 13 in suitable bearings on a secondary base-plate 14 which is disposed parallel with the plate 6, said shaft 13 being provided at its ends, transversely, with levers 15, and a pair of links 16 being employed, each link being pivotally connected with the gate and with a lever 15; and in operation, when a vehicle approaches near to a gate, its wheels will first engage the pair of loops $x$ of a crank-shaft which will cause a part rotation of the latter, its levers 15 being swung downwardly until the gate is disposed in a horizontal position, said gate having an upward swinging movement, as described, after the vehicle has passed over the gate.

A single gate is all that will be required in instances where travel is in one direction only, but two gates as shown in Figs. 1 and 2 are generally employed, their inclination, normally, being in opposed directions.

The gates, preferably, are disposed inclinedly in the direction of travel through a passageway, and since the loops $x$ of a crank-shaft are disposed in line with the plates 12 the wheels of a vehicle, after engaging and moving the loops $x$ will be quite certain to engage said plates 12.

The loops $x$ are of such length and the parts are so proportioned that, as soon as the wheels of a moving vehicle are disengaged from said loops they will engage the plates 12 of the gate. Each plate 6 is provided with a riser-block or strip 17, triangular in cross-section, adapted to be engaged by the wheels of a vehicle, so that jolting of the vehicle may be avoided when moving upon the gate, said gate, when in its lowermost position being disposed in the plane of said strip.

It will be understood that the principal function discharged by the upright sections 8 is to prevent live-stock from passing between the gate and the conventional gate-post 18. In instances where the gates 4 are normally disposed in a vertical position they may, of course, be swung in an arc of 90 degrees, and in such instances the sections 8 may be dispensed with, but it is an advantage to have the gate normally disposed approximately at an angle of 45 degrees for the reason that the stresses directed to the gate and its operating parts will be less; and by use of the construction as described, if the gate is maintained at an inclination, normally, of 45 degrees, the ordinary speed of an automobile need not be decreased when passing over the gate, the opening and closing parts operating automatically.

While I have described construction in detail, I do not wish to be understood as limiting myself in this respect, and changes in size, form, proportion and minor details may be made as found to be of advantage without departing from the spirit of the invention, said changes to be within the scope of the invention as claimed.

What I claim as my invention, and desire to secure by Letters Patent, is,—

The herein described means for closing two adjacent passageways, comprising a partition between the passageways, a pair of base-plates each disposed transversely of a passageway, stop-members on the partition, a pair of gates each provided on one of its sides with a pair of parallel track-plates and pivotally connected with a base-plate, counterbalancing means on said gates to normally cause them to move upwardly in a circle's arc for engaging the stop-members, a pair of rock-shafts in bearings, each being provided with a pair of levers and having a pair of loops inclined toward a gate in line with a track-plate, links arranged in pairs, each pair being pivotally connected with a gate and with the levers of a rock-shaft, said rock-shafts being movable for moving the gates downwardly in a circle's arc, the loops moving toward said track-plates.

In testimony whereof, I have affixed my signature in presence of two witnesses.

JOHN W. LAVERENCE.

Witnesses:
HIRAM A. STURGES,
M. C. DAVIS.